United States Patent
Ryznic

(10) Patent No.: US 7,841,834 B1
(45) Date of Patent: Nov. 30, 2010

(54) METHOD AND LEADING EDGE REPLACEMENT INSERT FOR REPAIRING A TURBINE ENGINE BLADE

(75) Inventor: John E Ryznic, Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 814 days.

(21) Appl. No.: 11/698,376

(22) Filed: Jan. 26, 2007

Related U.S. Application Data

(60) Provisional application No. 60/763,099, filed on Jan. 27, 2006.

(51) Int. Cl.
F04D 29/18 (2006.01)

(52) U.S. Cl. .................. 416/224; 416/229 A

(58) Field of Classification Search .......... 415/200; 416/62, 224, 229 R, 229 A, 230, 241 R; 29/889.1, 889.7, 889.71, 889.72
See application file for complete search history.

(56) References Cited

U.S. PATENT DOCUMENTS

| | | | |
|---|---|---|---|
| 2,431,249 A * | 11/1947 | Heppner | 29/889.21 |
| 3,275,295 A * | 9/1966 | Caldwell et al. | 416/224 |
| 3,561,886 A | 2/1971 | Kreischer, Jr. et al. | |
| 3,883,267 A * | 5/1975 | Baudier et al. | 416/230 |
| 4,053,259 A * | 10/1977 | Bianchi | 416/208 |
| 4,326,833 A | 4/1982 | Zelahy et al. | |
| 4,342,542 A | 8/1982 | Tan et al. | |
| 4,712,980 A | 12/1987 | Gely et al. | |
| 4,728,262 A * | 3/1988 | Marshall | 416/224 |
| 4,795,313 A * | 1/1989 | Coulon | 416/224 |
| 5,062,205 A | 11/1991 | Fraser | |
| 5,165,856 A * | 11/1992 | Schilling et al. | 416/204 R |
| 5,269,057 A * | 12/1993 | Mendham | 29/889.1 |
| 5,328,329 A * | 7/1994 | Monroe | 416/62 |
| 5,340,530 A | 8/1994 | Coulon | |
| 5,351,395 A | 10/1994 | Crawmer et al. | |
| 5,358,379 A * | 10/1994 | Pepperman et al. | 415/191 |
| 5,370,501 A * | 12/1994 | Udall | 416/216 |
| 5,448,828 A | 9/1995 | Willems et al. | |
| 5,531,570 A | 7/1996 | Mannava et al. | |
| 5,725,354 A * | 3/1998 | Wadia et al. | 416/224 |
| 5,755,031 A | 5/1998 | Baumgarten et al. | |
| 5,782,607 A * | 7/1998 | Smith et al. | 416/224 |
| 5,785,498 A | 7/1998 | Quinn et al. | |
| 5,791,874 A * | 8/1998 | Lang | 416/62 |
| 5,931,641 A * | 8/1999 | Finn et al. | 416/229 A |

(Continued)

*Primary Examiner*—Igor Kershteyn
(74) *Attorney, Agent, or Firm*—John Ryznic

(57) ABSTRACT

A replaceable leading edge insert for a rotor blade and a process for replacing a damaged leading edge portion of a blade on an integrally bladed rotor. The insert is a fibrous reinforced composite insert with a scarf joint to secure the insert to the blade. The insert includes an aft extending portion that engages with the opposed surface of the blade to hold the insert against radial displacement from the blade during operation. in one embodiment, a plurality of teeth extend from the lower portion of the insert and engage similar teeth on the rotor blade. When the insert is bonded to the rotor blade, the teeth add additional holding force against radial displacement should the bond weaken. The process includes removing a damaged portion from the blade leading edge such that a bonding surface remains for a standard shaped replaceable leading edge insert to fit on. The insert is bonded to the rotor blade to form a completed airfoil portion.

8 Claims, 4 Drawing Sheets

U.S. PATENT DOCUMENTS

| | | |
|---|---|---|
| 6,095,402 A | 8/2000 | Brownell et al. |
| 6,471,485 B1 | 10/2002 | Rossmann et al. |
| 6,508,000 B2 | 1/2003 | Burke et al. |
| 6,568,077 B1 | 5/2003 | Hellemann et al. |
| 6,572,336 B2 | 6/2003 | Horng et al. |

* cited by examiner

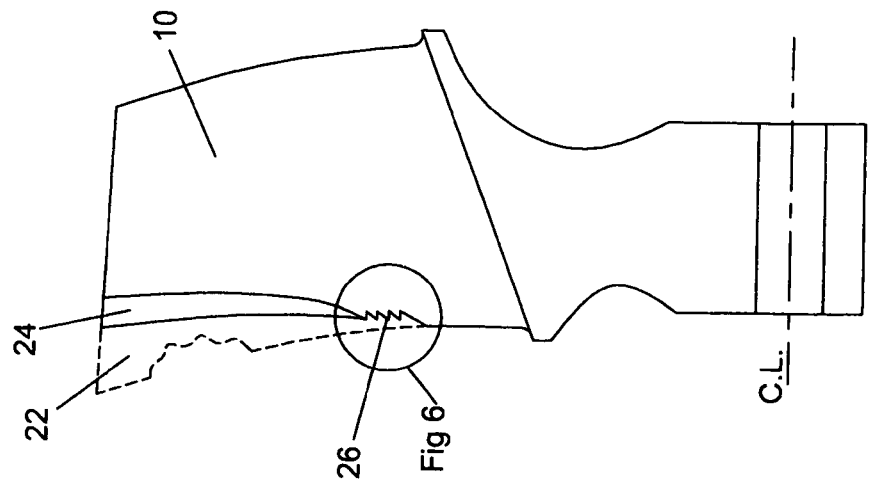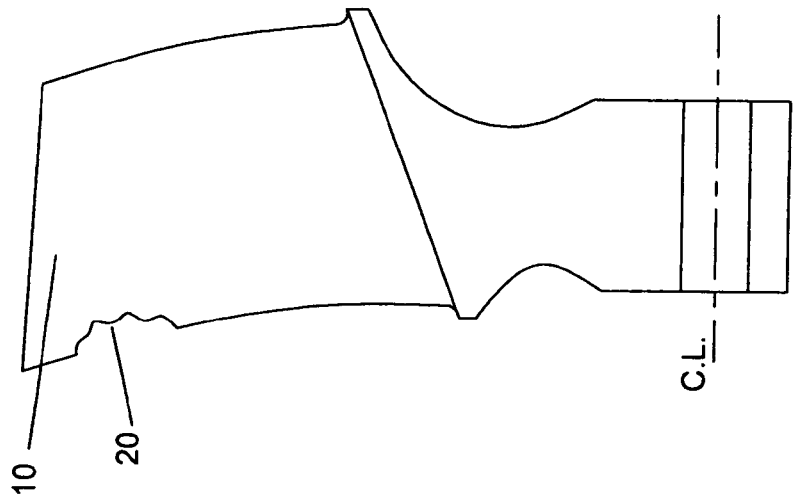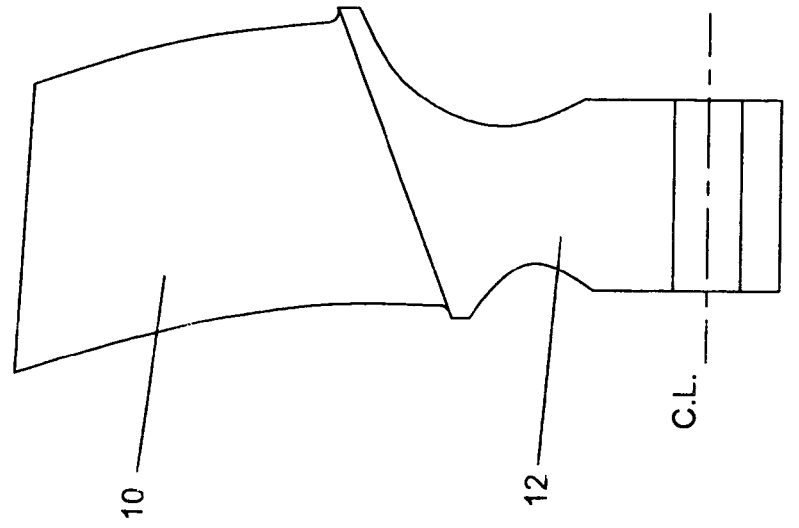

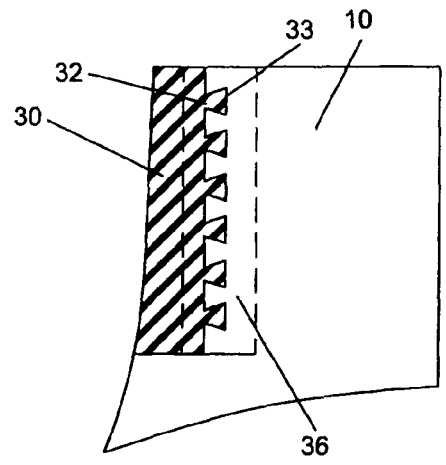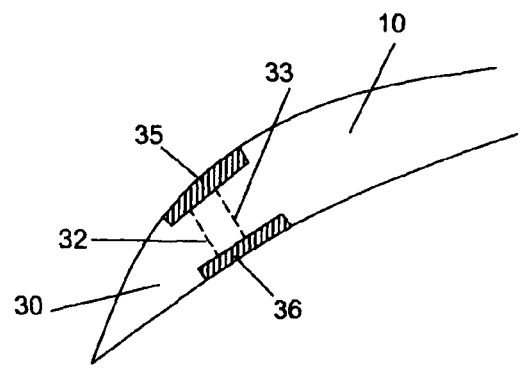
Fig 12  Fig 13
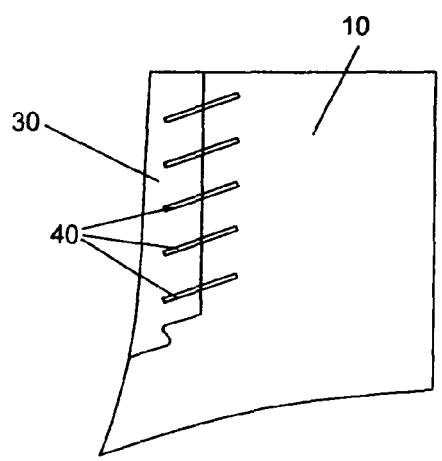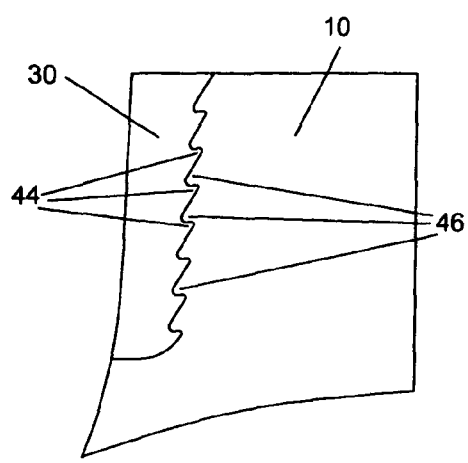
Fig 14  Fig 15

METHOD AND LEADING EDGE REPLACEMENT INSERT FOR REPAIRING A TURBINE ENGINE BLADE

CROSS-REFERENCE TO RELATED APPLICATIONS

This application claims the benefit to an earlier filed U.S. Provisional application 60/763,099 filed on Jan. 27, 2006 and entitled METHOD AND LEADING EDGE REPLACEMENT INSERT FOR REPAIRING A TURBINE ENGINE BLADE.

BACKGROUND OF THE INVENTION

1. Field of the Invention

The present invention relates to turbomachinery blades, and more specifically to a replaceable leading edge insert for a blade.

2. Description of the Related Art Including Information Disclosed Under 37 CFR 1.97 and 1.98

A gas turbine engine includes two types of rotor blades, i.e. fan or compressor blades, and turbine blades. Fan or compressor blades are rotated for pressurizing air, whereas turbine blades extract energy from hot combustion gases for powering the fan or compressor. Thus, airfoils of the fan or compressor blades are differently configured aerodynamically than are turbine blades.

A fan blade is a specialized form of compressor blade which is relatively larger for initially pressurizing air, a significant portion of which is used for providing propulsion thrust for powering an aircraft in flight. Individual fan blades are suitably mounted around the circumference of a rotor disk as either discrete components, or integrally therewith in the form of a one-piece integrally bladed disk or blisk. During rotation, the blades and disk rotate and therefore generate substantial centrifugal forces which are carried by the disk. As the disk rotates during normal operation of the engine, the predominantly radial centrifugal forces are developed in the blades which cause steady tensile stress therein. In addition to steady stress, the blades are also subject to alternating stress typically caused by vibration of the blade due to the airflow thereover. Neither of these stresses is uniform, but varies over the length, width, and thickness of the blade.

A bladed rotor disk of a gas turbine engine is a very complex and expensive piece of machinery. The fan blade assembly in the aero engine is susceptible to damage from a foreign object during flight such as a bird strike. Due to an impact, a piece of the leading edge of one or more blades can be damaged and require replacement to maintain proper efficiency of the fan. In an integrally bladed rotor disk or blisk, one cannot remove the blade and replace the damaged blade with a new blade because the entire bladed disk is formed as a single piece.

In a common configuration, compressor blades include integral dovetails for being removably mounted in a corresponding dovetail slot in the perimeter of a rotor disk. This permits the individual manufacture of each blade, and the individual replacement thereof in the event of blade damage during operation. However, such bladed disks require an enlarged disk rim for limiting centrifugal reaction stresses therein around the axial or circumferential dovetail slots used for radially retaining a corresponding row of rotor blades.

A modern improvement over bladed disks in a gas turbine engine is a row of rotor airfoils integrally formed with the perimeter of a rotor disk in a one-piece or unitary blisk configuration. The blade dovetails are eliminated along with the corresponding dovetail slots in the perimeter of the disk, and centrifugal loads are carried from the individual airfoils into the corresponding disk with an inherently strong load path there between. Accordingly, blisks are mechanically stronger than bladed-disks and thusly may be more efficiently configured for reducing disk size and weight for providing additional advantages and performance of the engine.

However, since the blisk airfoils are integrally formed with the supporting disk, the airfoils are not individually removable or replaceable in the event of foreign object damage thereof. Relatively small compressor blisks have been used in commercial service for many years, and are sufficiently small that they may be simply replaced in whole in the event of excessive damage to one or more of the airfoils thereof.

Alternatively, where damage is relatively minor, the damage may be simply removed, by grinding for example, thusly leaving the airfoil with a less than original configuration. This damage removal method is unacceptable for major airfoil damage since aerodynamic performance will be severely degraded, and significant rotor imbalance therefrom may be difficult to correct with ordinary balancing procedures.

Furthermore, damage removal may adversely affect strength of the airfoil itself. A typical compressor airfoil is slender and has a crescent or airfoil profile extending axially between thin leading and trailing edges. The airfoil is cantilevered from its root, with a radially opposite tip spaced closely adjacent to a surrounding casing or shroud during operation. The airfoil is typically twisted from root to tip with a complex three dimensional (3D) configuration or contour for aerodynamically pressurizing airflow during operation.

The contoured airfoil is subject to aerodynamic and centrifugal loads during operation which result in a varying pattern of stress therein. The airfoil must thusly be designed for limiting the maximum airfoil stress for enjoying a suitable useful life during operation, and the airfoil material is typically a high strength material, such as titanium, for accommodating the substantial loads carried during operation.

In the original manufacture of the blisk, its material strength must not be reduced or compromised by the various machining processes used. Excessive temperature must be avoided which would degrade material properties. For example, the machining of the individual airfoils may be done using a milling machine or an electrochemical machine having numerically controlled multiple axes for precision movement. Material is removed from the original work piece or blank with minimal heat buildup to prevent degradation of the material strength.

Accordingly, the known repair process for compressor blisks is limited to the mere removal of airfoil damage to prevent strength reduction of the airfoil.

The advantages of using compressor blisks in a gas turbine engine are presently promoting the development of substantially larger and more expensive blisks for use in multi-stage axial compressors and low pressure fan compressors upstream therefrom. Fan blisks have relatively thick airfoils and are subject to considerably less foreign object damage than the relatively thin airfoils of compressor blisks downstream therefrom. The compressor blisks are nevertheless relatively large and quite expensive.

For example, a two stage tandem blisk includes two rows of airfoils extending from corresponding disks in a unitary assembly. Damage to any one of the blisk airfoils in either stage affects the usefulness of the entire two stage blisk. The inability to repair a two stage blisk requires the entire replacement thereof at a corresponding substantial cost.

Accordingly, it is desired to provide a method of repairing a blisk for restoring airfoils thereof to an original configuration at the repair site.

Prior art inventions such as U.S. Pat. No. 4,326,833 issued to Zelahy et al. on Apr. 27, 1982 shows gas turbine engine air cooled blade member which is separately attached to a rotor disk, where the blade can be repaired by removing from the blade at least one blade segment which comprises an edge portion, a part of the chamber wall, and a part of the platform connected with and extending from the edge portion and connected with the chamber wall. The replacement member is of substantially the same type material and of a size and shape which matches the removed blade segment. The replacement segment is bonded to the blade to form a completed blade assembly.

Another well known method of repairing damaged blades is disclosed in U.S. Pat. No. 5,755,031 issued to Baumgarten et al. on May 26, 1998 which shows a method for replacing a rotor blade on an integrally bladed rotor by removing the entire damaged rotor blade while leaving a stub portion extending out of the disk, providing a die around the stub portion, extruding a portion of the stub to form a blade platform, and attaching a new rotor blade to the platform.

U.S. Pat. No. 6,095,402 issued to Brownell et al. on Aug. 1, 2000 shows a method for the manufacture or repair of a blisk by linear friction welding, in which the method comprises providing a stub on the circumferential surface of a turbine disk and defining a weld joint surface on the radially outermost face of the stub. A new blade is applied radially to the stub and welded to the stub to form a new bladed extending from the rotor disk.

U.S. Pat. No. 6,508,000 issued to Burke et al on Jan. 21, 2003 shows a transient liquid phase bonding repair for advanced turbine blades and vanes in which a damaged portion of the leading edge of the blade is removed, and an insert is fabricated to match the removed portion. The insert is then bonded to the blade.

U.S. Pat. No. 6,568,077 issued to Hellemann et al. on May 27, 2003 discloses a blisk weld repair in which a damaged blade is repaired by removing a portion of the damaged blade by machining away from the airfoil to create a cutout or notch in the airfoil, filling the notch by welding a repair to the blade, and then machining the weld repair to restore the airfoil to substantially the original, pre-damaged configuration at the repair site.

U.S. Pat. No. 5,785,498 issued to Quinn et al on Jul. 28, 1998 and entitled COMPOSITE FAN BLADE TRAILING EDGE REINFORCEMENT shows a wide chord fan blade with a reinforced region at the blade tip that is covered by a thin metallic sheathing bonded to the trailing edge with an embodiment in FIG. 3 that uses a mechanical fastener (a threaded nut and bolt) disposed through the entire local thickness of the airfoil to further secure the metallic sheathing to the airfoil.

A disadvantage of the Zelahy et al. patent is that the leading edge replacement portion of the blade is held in place in the radial direction only by the bond strength between the replacement piece and the remaining blade. The high rotational speeds of the bladed disk produce very high centrifugal force. The bond could break and the leading edge replacement portion could separate from the blade.

A disadvantage of the Baumgarten et al. and Brownell et al. patents is that the entire damaged disk is replaced, and that the repair process cannot be performed in the field, but at a repair facility.

The Burke patent uses a replacement part that is customized to the damaged part being replaced, and thus one replacement part will not work on another blade on the same integrally bladed disk or blisk.

The Hellemann et al. invention also lacks the means to radially hold the leading edge replacement to the blade, and also must be down at a repair facility and not in the field. Also, the Hellemann repaired blade is custom fitted to the damaged blade, and therefore the leading edge replacement piece cannot be used on another blade of the same blisk.

It is an object of the present invention to provide a method of and a leading edge insert member to repair a damaged blade of a blisk used in a gas turbine engine.

It is another object of the present invention to provide a leading edge insert member that is radially fixed on the blade to prevent breaking of the bond due to centrifugal force acting on the insert from high speed rotation.

It is still another object of the present invention to provide for an insert that is standardized in shape so that one insert can be used on any blade of the blisk.

It is still another object of the present invention to allow for a damaged blade to be repaired in the field instead of a machine shop or repair facility.

Another object of the present invention is to provide for a blade insert that will allow for easy separation of parts that have been joined previously for in the field replacement.

BRIEF SUMMARY OF THE INVENTION

The present invention is a replaceable insert for a leading edge of a rotor blade and a method of repairing a damaged leading edge of a rotor blade on an integrally bladed disk or blisk of a gas turbine engine in which a damaged portion of the blade is removed by machining and a step is formed on the blade to act as a radial force restraining means for the insert member used to repair the blade. The insert member is formed of a composite material and is bonded to the titanium blade by any well known methods used. The insert member is formed of a standard size and shape so that any insert member can be used on any blade of the blisk. When the material of the damaged blade is removed, the notch is formed of the standard shape sop that the standard sized insert will fit in the notch. This way, customized inserts do not need to be made. Also, if a repaired blade is damaged again, the damage can be repaired by removing the damaged insert and installing a new insert of the same size and shape by bonding the new insert o the notch. Also, one specific tool could be used to cut the standard sized notch from any of the blades in the blisk. Thus, the cost of repairing a damaged blisk is reduced. The insert is secured to the blade by an epoxy bonding system in which the bond joint is cleanly released by applying a direct current to the two parts that cause a chemical reaction in the epoxy bond.

BRIEF DESCRIPTION OF THE SEVERAL VIEWS OF THE DRAWINGS

FIG. 1 shows an undamaged blade of a blisk.

FIG. 2 shows a damaged leading edge portion of the blade.

FIG. 3 shows the standard shaped portion removed from the damaged leading edge of the blade.

FIG. 12 shows a third embodiment of the cut-out or notch formed in the blade in which the radial limiting portion is a dove-tail shaped cut-out.

FIG. 13 shows a top cross section view of the dove-tail cut-outs of the FIG. 13 embodiment with two outer bond sheets.

FIG. 14 shows a fourth embodiment of the cut-out or notch formed in the blade in which the radial limiting portion is a plurality of pins extending into holes in the blade.

FIG. 15 is a fifth embodiment of the cut-out or notch formed in the blade in which the radial limiting portion is plurality of smooth saw-tooth members.

DETAILED DESCRIPTION OF THE INVENTION

Figure 6:
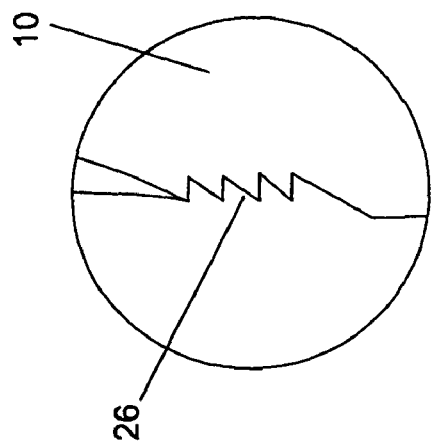
FIG. 6 shows an enlarged view of the saw toothed shaped radial engaging portion of the machined cut-out or notch formed in the blade.

The present invention is a replaceable leading edge insert for a rotor blade, and an integrally bladed disk (or, blisk) used in a gas turbine engine, preferably the fan of the engine which is the most likely bladed portion of the engine to be damaged by foreign objects. FIG. 1 shows an undamaged blade 10 integral with a rotor 12 to form the blisk. Only one blade is shown in FIG. 1. The blisk includes a plurality of like blades spaced a common distance circumferentially around the rotor to form the fan section. FIG. 2 shows a blade 10 with a damaged leading edge portion 20. A foreign object can hit to rotating blade during operation and cause a portion of the blade to bend or break off.

To repair the damaged blade of the blisk, a portion of the leading edge is removed from the blade as represented in FIG. 3, and includes a completely removed portion 22 and a tapered portion 24 extending from the completely removed portion 22 to the side of the blade 10. The machined cut-out (portion 22 and portion 24) extends from a point near the rotor disk to the tip of the blade. The machined cut-out is a standard size and shape as described further below. A saw-tooth shaped portion 26 is machined into the leading edge portion that is removed from the blade in order to form a radial force restraining step for an insert to be attached to the removed portion of the blade as described below. The saw-tooth shaped portion 26 has a plurality of teeth that acts to hold the insert in a radial direction against a centrifugal force developed during high speed rotation of the blisk that would tend to cause the bond between the insert and the blade to slip. The number of teeth can vary depending upon the size of the blade and the size of each tooth. The teeth are to be small enough so that the stresses developed around the teeth do not cause the remaining blade portion to crack.

A standard sized cut-out is removed by machining for each blade that is to be repaired. This is such that a standard size and shape composite leading edge insert 30 can be secured in the cut-out and teeth portion to restore to damaged blade to its original shape. One insert 30 can be used on any of the blades on the blisk. If a repaired blade with a bonded insert 30 is damaged again, then no further machining of the blade is required. The damaged insert 30 can be removed, and a new insert can be secured to the blade in the field. In the present invention, the blisk is made of titanium, while the composite leading edge insert 30 is made from either bismalemaide resin combined with IM& carbon fiber, or BMI combined with structural fiberglass fibers ("S" glass), or a toughened epoxy combined with carbon fiber or combinations of the above. The composite leading edge insert of the present invention provides for a sacrificial airfoil leading edge that can be field refurbished at the aircraft for conventional and integrally bladed rotor designs, improved fan performance, improved survivability, reduced weight, and provides mechanical damping to the blisk rotor. The composite leading edge insert 30 also will act as a shock absorber providing protection for the base titanium substrate.

The composite leading edge insert 30 is bonded to the titanium blade using an electrically debonding adhesive as disclosed in the U.S. Pat. No. 6,620,308 issued to Gilbert on Sep. 16, 2003, the entire patent of which is incorporated by reference herein. The bonding material is a high strength aliphatic amine cured epoxy with good shear strength properties. The electric al release of the bonding material requires that the composite leading edge insert 30 and the titanium blade be electrically insulated. The de-bonding process works by passing a direct electric current through the epoxy. To accomplish this, electric insulation is provided at the aft-end joints between the insert and the titanium blade. The direct current is applied such that the titanium substrate would be the positively charged (anode) element so that, once the part is removed, it is free of any epoxy residue. The epoxy bonding material will remain on the composite insert when released.

The composite leading edge insert 30 is produced using one of several high quality molding processes including resin transfer molding (RTM), filament winding or autoclave. The insert 30 is joined to the blade by a scarf joint. The metal substrate blade can be either hollow or solid and will be aerodynamically viable in the event the leading edge becomes separated from the blade substrate. Also, the composite insert 30 is frangible so that in the case of Foreign Object Damage (FOD) on the leading edge, the separated composite piece will not damage the engine downstream.

Figure 7:
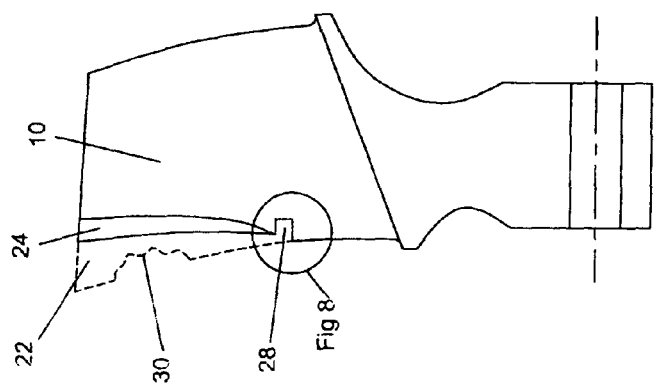
FIG. 7 shows a second embodiment of the cut-out or notch formed in the blade in which the radial limiting portion is a step shaped cut-out.
Figure 8:
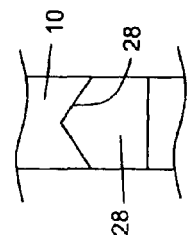
FIG. 8 shows an enlarged view of the radial limiting portion of the cut-out of FIG. 7.

A second embodiment of the present invention is shown in FIGS. 7 and 8. Instead of the saw-tooth radial holding design of the first embodiment, the second embodiment uses a single step shaped portion 28 machined into the blade. The step shaped portion 28 is shown in detail in FIG. 8 from a front view. The top of the step portion 28 has a roof shape or inverted V 29 in order to allow for the composite insert 30 to be centered on the blade 10 and to hold the insert 30 against movement in the radial direction as described in the first embodiment. It is also envisioned that the inverted V portion can be eliminated, and a flat step portion can be used.

Figure 11:
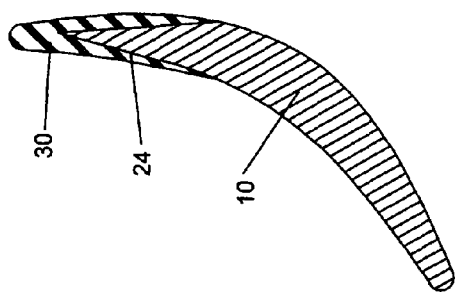
FIG. 11 shows a third embodiment of the cut-out portion from the blade which forms the surface area for bonding the insert to the blade.
Figure 10:
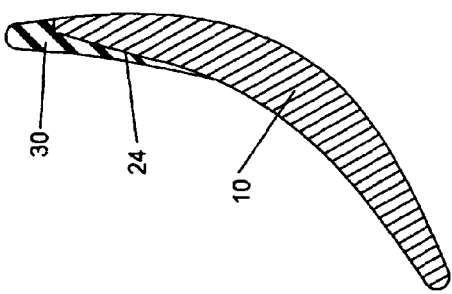
FIG. 10 shows a second embodiment of the cut-out portion from the blade which forms the surface area for bonding the insert to the blade.
Figure 9:
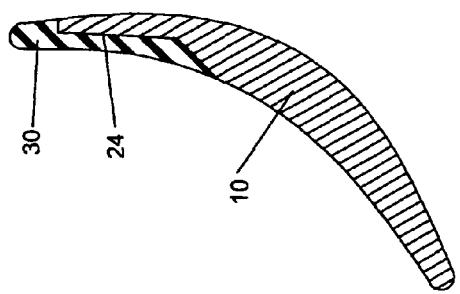
FIG. 9 shows a cross section of a repaired blade from a top view in which the composite leading edge is secured to the notch of the titanium blade.

FIG. 9 shows a cross section view of the bond surfaces between the composite insert 30 and the titanium blade 10. The leading edge portion of the blade is removed and the blade is machined to that section of the insert can be laid against the blade to form the scarf joint that increases the bonding surface between the insert 30 and the blade 10. The scarf joint can be a step formed cross section like that shown in FIG. 9, or it can be a flat slanted surface extending from the front of the cut-out portion toward the end where the cut-out joins the blade surface as represented in FIG. 10. The insert tail is bonded on the pressure side of the blade to reduce chance of the bond from slipping off. The force of the compressed air that the fan pushes through the engine will act to press the insert against the bonding surface 24 of the blade 10. In FIG. 11, the bonding surface 24 is a scarf joint.

FIGS. 12 through 15 show additional embodiments for the shape of various connecting means between the composite insert 30 and the leading edge of the blade 10 that prevent radial movement of the insert due to the centrifugal forces. FIG. 12 uses a series of dove-tail joints between the insert and the blade. FIG. 13 shows a top view of a cross section of the dove-tail connection. A rear edge 33 of a dove-tail in the insert 30 slides within an opening 32 in the dove-tail slot in the blade. Outer bond sheets 35 and 36 are secured within slots formed along the side of the blade and insert to prevent the dove-tails from sliding out of the slots.

FIG. 14 shows the insert 30 secured against radial movement by a plurality of pins 40 connecting the insert to the blade 10 at approximately 30 degree angles. FIG. 15 shows the connection between the insert and the blade to be a plurality of smooth saw-tooth members 44 in the insert angled upward that fit within similar shaped saw-tooth members 46 in the blade to limit radial movement of the insert.

Figure 5:
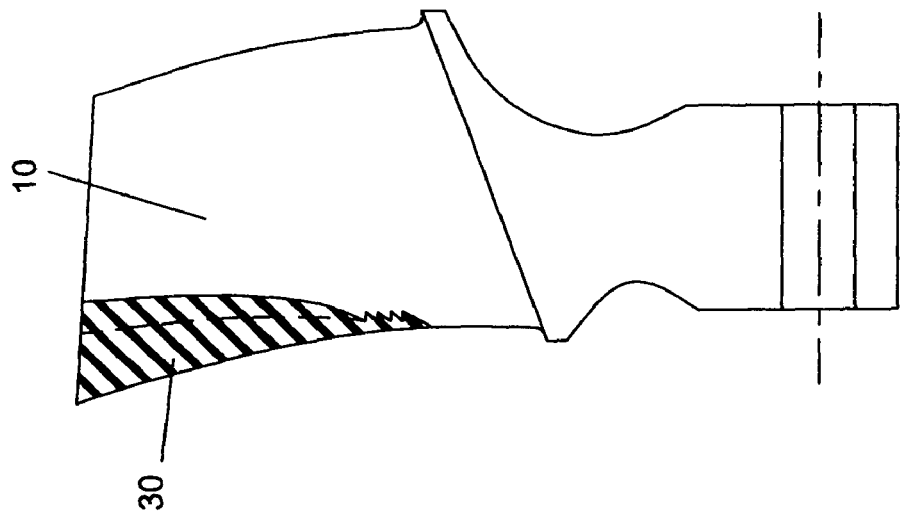
FIG. 5 shows a repaired blade with a composite leading edge insert secured to the blade.
Figure 4:
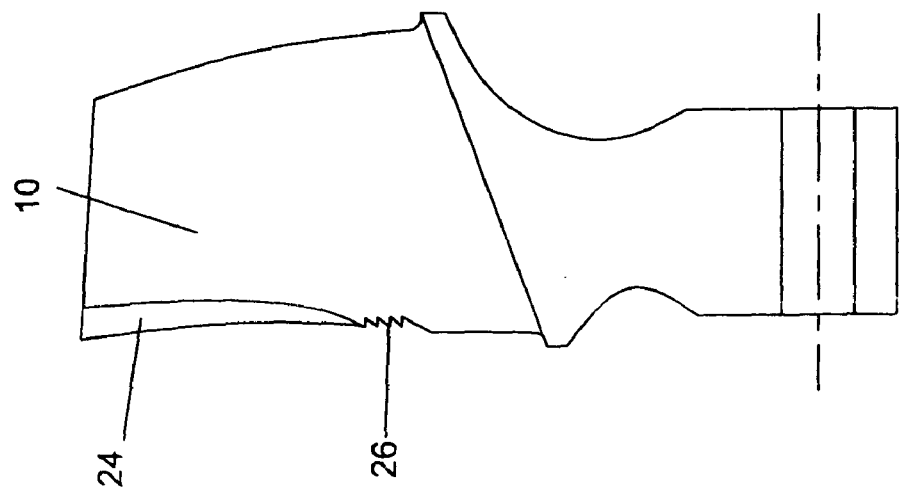
FIG. 4 shows the blade after the damaged portion has been removed.

The replaceable insert is secured to a rotor blade that has the damaged leading edge portion removed to form an incomplete airfoil surface as seen in FIG. 4. The completed airfoil surface would be the rotor blade in FIG. 1 or the rotor blade with the insert secured to the leading edge as seen in FIG. 5.

I claim:

1. A replaceable leading edge insert for use on a rotor blade, the rotor blade having an incomplete leading edge surface in which the replaceable leading edge insert completes the leading edge surface, the replaceable leading edge insert comprising:
   a bonding surface to bond the insert to at least one of the pressure side and suction side of the airfoil leading edge; and,
   the insert comprises a plurality of teeth extending from a lower portion of the insert that engage similar shaped teeth extending from the blade.

2. The replaceable leading edge insert of claim 1, and further comprising:
   the teeth extend along substantially the entire aft length of the insert.

3. The replaceable leading edge insert of claim 1, and further comprising:
   the insert includes a scarf joint for bonding to the rotor blade.

4. The replaceable leading edge insert of claim 1, and further comprising:
   the insert extends to the blade tip.

5. An integrally bladed rotor comprising:
   a rotor disk;
   a plurality of rotor blades extending from the rotor disk;
   each rotor blade having a leading edge insert portion removed from the blade; and,
   a replaceable leading edge insert bonded to each of the rotor blades, and insert comprises a plurality of teeth extending from a lower portion of the insert that engage similar shaped teeth extending from the blade.

6. The integrally bladed rotor of claim 5, and further comprising:
   the teeth extend along substantially the entire aft length of the insert.

7. The integrally bladed rotor of claim 5, and further comprising:
   the insert includes a scarf joint for bonding to the rotor blade.

8. The integrally bladed rotor of claim 5, and further comprising:
   the insert extends to the blade tip.

* * * * *